(12) United States Patent
Michelson et al.

(10) Patent No.: US 7,058,578 B2
(45) Date of Patent: Jun. 6, 2006

(54) MEDIA TRANSLATOR FOR TRANSACTION PROCESSING SYSTEM

(75) Inventors: Mark J. Michelson, Elburn, IL (US);
Roger A. Sumner, Batavia, IL (US);
Mark J. Power, Carol Stream, IL (US);
Carlo Bonifazi, Woodridge, IL (US);
Jeffrey D. Hodson, Wheaton, IL (US);
Craig R. Shambaugh, Wheaton, IL (US); Robert P. Beckstrom,
Bolingbrook, IL (US); Anthony J. Dezonno, Blommingdale, IL (US)

(73) Assignee: Rockwell Electronic Commerce Technologies, L.L.C., Wood Dale, IL (US)

( * ) Notice: Subject to any disclaimer, the term of this patent is extended or adjusted under 35 U.S.C. 154(b) by 855 days.

(21) Appl. No.: 10/253,094

(22) Filed: Sep. 24, 2002

(65) Prior Publication Data
US 2004/0059580 A1    Mar. 25, 2004

(51) Int. Cl.
*G10L 21/00* (2006.01)
(52) U.S. Cl. .................................................. 704/270.1
(58) Field of Classification Search .................... None
See application file for complete search history.

(56) References Cited

U.S. PATENT DOCUMENTS

| | | | |
|---|---|---|---|
| 5,127,004 A | 6/1992 | Lenihan et al. | |
| 5,140,611 A | 8/1992 | Jones et al. | |
| 5,268,903 A | 12/1993 | Jones et al. | |
| 5,771,273 A * | 6/1998 | McAllister et al. | 704/270.1 |
| 5,915,001 A * | 6/1999 | Uppaluru | 704/270.1 |
| 5,918,213 A * | 6/1999 | Bernard et al. | 705/26 |
| 5,983,200 A * | 11/1999 | Slotznick | 705/26 |
| 6,097,806 A | 8/2000 | Baker et al. | |
| 6,108,640 A * | 8/2000 | Slotznick | 705/26 |
| 6,115,737 A * | 9/2000 | Ely et al. | 709/203 |
| 6,134,548 A * | 10/2000 | Gottsman et al. | 707/5 |
| 6,195,651 B1 * | 2/2001 | Handel et al. | 707/2 |
| 6,289,373 B1 | 9/2001 | Dezonno | |
| 6,327,570 B1 * | 12/2001 | Stevens | 705/7 |

FOREIGN PATENT DOCUMENTS

| | | |
|---|---|---|
| EP | 1 193 961 A2 | 4/2002 |
| EP | 1 241 600 A1 | 9/2002 |
| GB | 2 386 289 A | 9/2003 |
| WO | WO 01/73750 A3 | 10/2001 |

* cited by examiner

*Primary Examiner*—David D. Knepper
(74) *Attorney, Agent, or Firm*—Welsh & Katz, Ltd.

(57) ABSTRACT

A media handler is used in a transaction processing system, where the system is configured to route incoming calls from callers to agents associated with the transaction processing system, and the incoming calls are based on voice-mode communication and text-mode communication. The media handler includes a media translator operatively incorporated into the transaction processing system and configured to facilitate translation between the voice-mode communication and the text-mode communication. An agent preference setting is selectable by the agent between a voice-mode and a text-mode. Also included is a speech recognition unit configured to convert the voice-mode communication to the text-mode communication and a speech synthesizer configured to convert the text-mode communication to the voice-mode communication.

20 Claims, 3 Drawing Sheets

MEDIA TRANSLATOR FOR TRANSACTION PROCESSING SYSTEM

FIELD OF THE INVENTION

The present invention relates generally to an apparatus and methods for presenting routed calls to agents of a transaction processing system and/or an automatic call distribution system ("ACD"), and more specifically to an apparatus and methods for translating a media type of an incoming contact based upon an agent preference.

BACKGROUND

Systems which automatically distribute customer contacts or calls (generically referred to as "ACD") are often employed in telemarketing environments in which agents stationed at agent telephone sets answer many different types of telephone calls and other types of customer contacts (e.g., VoIP, emails, facsimile, chat room dialog, instant messages, other Internet contacts, etc.) from customers during a work day. As referred to herein, an ACD may be referred to as an automatic call distributor or an automatic contact distributor because the ACD handles a variety of communication media. In other words, the ACD handles many forms of communication, not just telephone calls in which a potential customer speaks with an agent. The term "ACD" may apply to any type of transaction processing system, and need not apply only to dedicated telemarketing systems or automatic call distributors. In some known ACD's, the agent may receive certain information about the type of customer call (i.e. contact) on a visual display at the agent set when a call or contact is distributed to the agent. An ACD is any such system which performs these functions and, for example, may employ a wide variety of architectures including integrated centralized systems, distributed systems, systems using one or more personal computers or servers, etc.

In some embodiments, ACD's may be used to support a number of different vendors in their telemarketing effort, and in such marketing environments, the agent is typically in communication with the customer or potential customer with respect to or on behalf of a particular vendor. The next contact that the agent processes may be on behalf of the same vendor or on behalf of a different vendor. In another embodiment, ACD's may be used exclusively by or on behalf of a single vendor such that all of the contacts processed by the agent involve one particular vendor.

Often, a customer call is distributed to an agent that involves interactive voice dialog. This means a normal two-way verbal exchange. An ACD, however, may also distribute a non-voice dialog contact or call to the agent. This does not involve direct two-way speech between the agent and the customer or caller. Non-voice dialog communication may be, for example, emails, facsimile, chat room dialog, instant messaging, Internet, etc. and the like. This is becoming more common as Internet traffic and electronic sales transactions increase. Handling of the non-voice dialog contact may in some instances require a specialized device or subcomponent of the ACD. In this situation, the agent may typically view text on a display screen that the caller typed in or transmitted. In response, the agent may provide information to the contact or request information from the caller, via the keyboard or other input device. Essentially, the dialog between the agent and the caller occurs on a display screen. Further, the agent may handle multiple calls. For example, the agent may typically handle two to five (or more) simultaneous non-voice dialog communications or transactions, which may be presented as two to five separate dialog windows on the display screen, which windows may, for example, be tiled or layered. Of course, the number of simultaneous transactions may vary significantly.

Typically, if a voice dialog or voice mode communication is received by the ACD system and routed to the agent, the agent responds verbally and engages in a voice dialog with the caller. Similarly, if a text-base message, such as email or chat, is received by the agent, the agent may typically respond using the same medium, meaning the agent types his or her response and transmits the message it to the caller. However, an agent may prefer one medium over another. For example, an agent may have poor typing skills, and therefore may prefer to speak with the caller. However, in known communication systems, if a non-voice dialog or text-base call is routed to a particular agent, the agent is essentially forced to respond using the same medium, namely text, and thus may be at a disadvantage due to his or her particular lack of skill in handling communications in that particular medium.

In the converse scenario, a voice-dialog message may be routed to an agent who prefers to type all responses and does not wish to engage in a verbal dialog with the caller. Perhaps the agent has exceptional typing skills or the agent's native language is different than the caller's native language, and is thus may not be particularly proficient in the caller's language. Accordingly, the agent may prefer to use text-based dialog. Again, in known communication systems, the agent in this scenario would be essentially forced to respond using verbal communication. This is inefficient and may be costly in terms of transaction speed, transaction accuracy, and customer satisfaction.

A need exists to permit the agent of a transaction processing system to select a preferred mode of communication with a customer or potential customer even though the call was not initiated using that mode, and which would automatically translate the call medium into the preferred medium.

SUMMARY

The disadvantages of present transaction processing systems may be substantially overcome by novel apparatus and methods for translating a medium of communication.

More specifically, in one embodiment, a media handler is used in a transaction processing system, where the system is configured to route incoming calls from callers to agents associated with the transaction processing system, and the incoming calls are based on voice-mode communication and text-mode communication. The media handler includes a media translator configured to facilitate translation between the voice-mode communication and the text-mode communication. An agent preference setting is selectable by the agent between a voice-mode and a text-mode. Also included is a speech recognition unit configured to convert the voice-mode communication to the text-mode communication, and a speech synthesizer configured to convert the text-mode communication to the voice-mode communication.

In one embodiment, for example, if the agent preference setting is set to the voice-mode and communication from the caller is a text-mode communication, the speech synthesizer converts the text-mode communication from the caller to a voice-mode communication for the agent, and the speech recognition unit converts the voice-mode communication from the agent to a text-mode communication for the caller, so that all communication received by the agent and sent by the agent is in the voice-mode.

Conversely, in another example, if the agent preference setting is set to the text-mode and communication from the caller is a voice-mode communication, the speech synthesizer converts the text-mode communication from the agent to a voice-mode communication for the caller, and the speech recognition unit converts the voice-mode communication from the caller to a text-mode communication for the agent, so that all communication received by the agent and sent by the agent is in the text-mode.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

DETAILED DESCRIPTION

In this written description, the use of the disjunctive is intended to include the conjunctive. The use of definite or indefinite articles in not intended to indicate cardinality. In particular, a reference to "the" object or thing or "an" object or "a" thing is intended to also describe a plurality of such objects or things.

Figure 1:
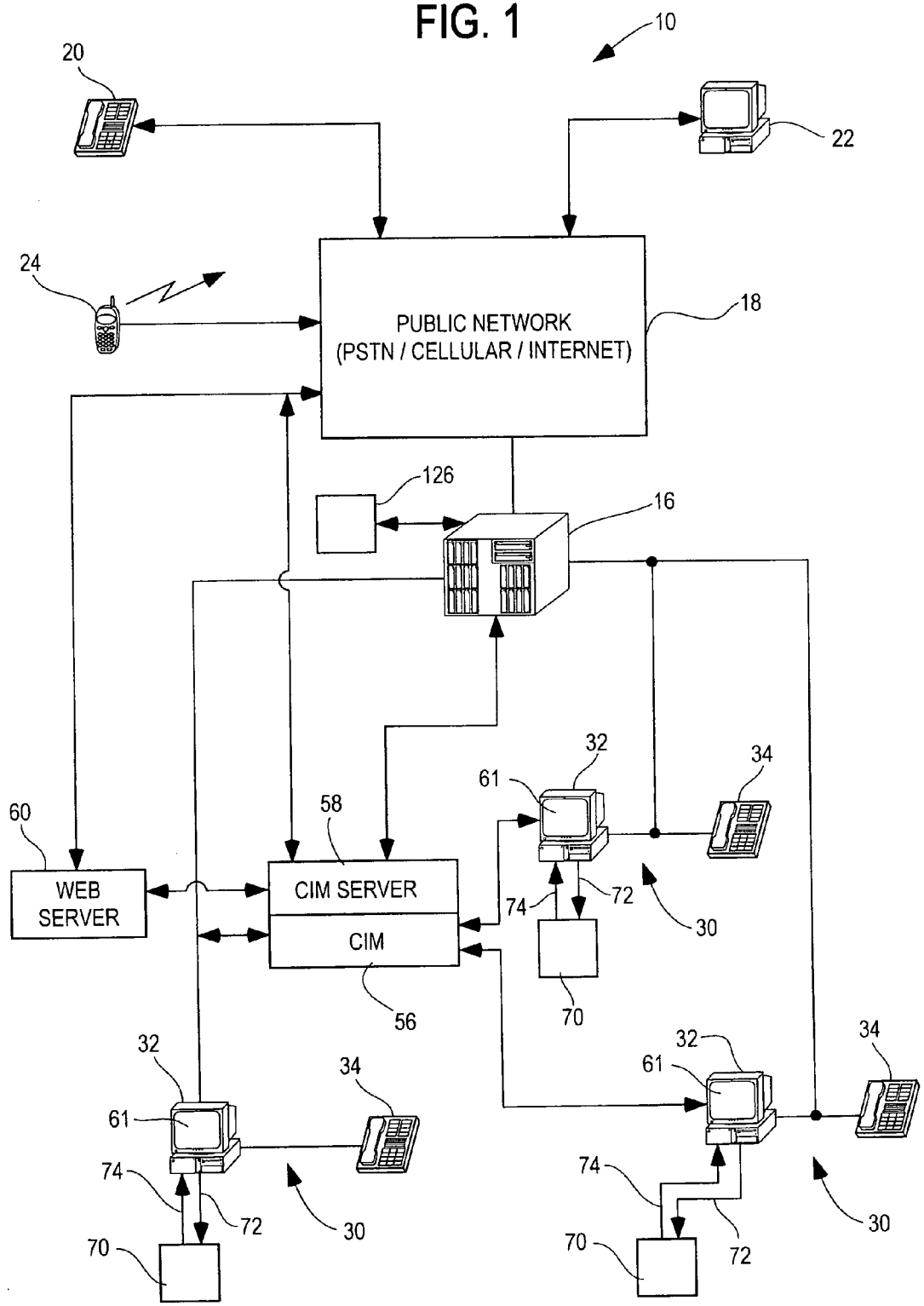
FIG. 1 is a pictorial representation of a specific embodiment of a transaction processing system showing a customer computer and an exemplary media translator.

Referring now to FIG. 1, an exemplary embodiment of a system 10 for facilitating routing of incoming calls or contacts ("transactions") to agents associated with a transaction processing system, which may also be referred to as an automatic call distribution or automatic contact distribution system (ACD) 16, is shown generally. The ACD 16 processes both voice-dialog communications or transactions, as well as non-voice dialog communications and transactions, as described hereinafter. The present invention may be implemented in numerous types and sizes of systems for distributing calls to selected ones of a plurality of agents. Examples of ACD systems that may be used in the present invention are the SPECTRUM ACD and Transcend ACD products available from Rockwell FirstPoint Contact.

Other types of call distribution systems including, for example, distribution systems or those using one or more personal computers or servers, may also be used. Some other suitable ACD's are disclosed in U.S. Pat. No. 5,268,903, issued to Jones et al. on Dec. 7, 1993, entitled "Multichannel Telephonic Switching Network With Different Signaling Formats and Connect/PBX Treatment Selectable For Each Channel," U.S. Pat. No. 5,140,611, issued to Jones et al. on Aug. 18, 1992, entitled "Pulse width Modulated Self-Clocking and Self-Synchronizing Data Transmission and Method for a Telephonic Communication Switching System," U.S. Pat. No. 5,127,004, issued to Lenihan et al. on Jun. 30, 1992, entitled "Tone and Announcement Message Code Generator for a Telephonic Switching System and Method," U.S. Pat. No. 6,289,373 B1, issued to Dezonno on Sep. 11, 2001, entitled "Method of Processing E-Mail in an Automatic Call Distributor," and U.S. Pat. No. 6,097,806, issued to Baker et al. on Aug. 1, 2000, entitled "ACD with Multi-Lingual Agent Position," the disclosures of which are hereby incorporated by reference in their entirety.

A customer or caller may be connected to the ACD 16 through a public switched telephone network (PSTN) 18 or other suitable communication network, which caller may connect to the network through a standard telephone set 20, a computer 22, a cellular telephone 24, or any suitable communication device. Note that the term "caller" as used herein does not necessarily mean that the contact or person using the telephone 20, for example, initiated the call to the agent. Notably, the agent may have initiated the call to the contact. Accordingly, the term "caller" shall broadly refer to the contact or potential customer even though the agent may have originated or initiated the call or contact. Additionally, the term "call" may be a telephone call, or it may be any other form of communication (emails etc.) as set forth above.

In the illustrated embodiment, multiple agent stations or terminals 30 are shown coupled to the ACD 16. For purposes of illustration, only three agent stations are shown, but any suitable number of agents may be coupled to the ACD 16. The agent stations 30 may also include agent station computers 32 or terminals, and/or telephone sets 34.

Figure 2:
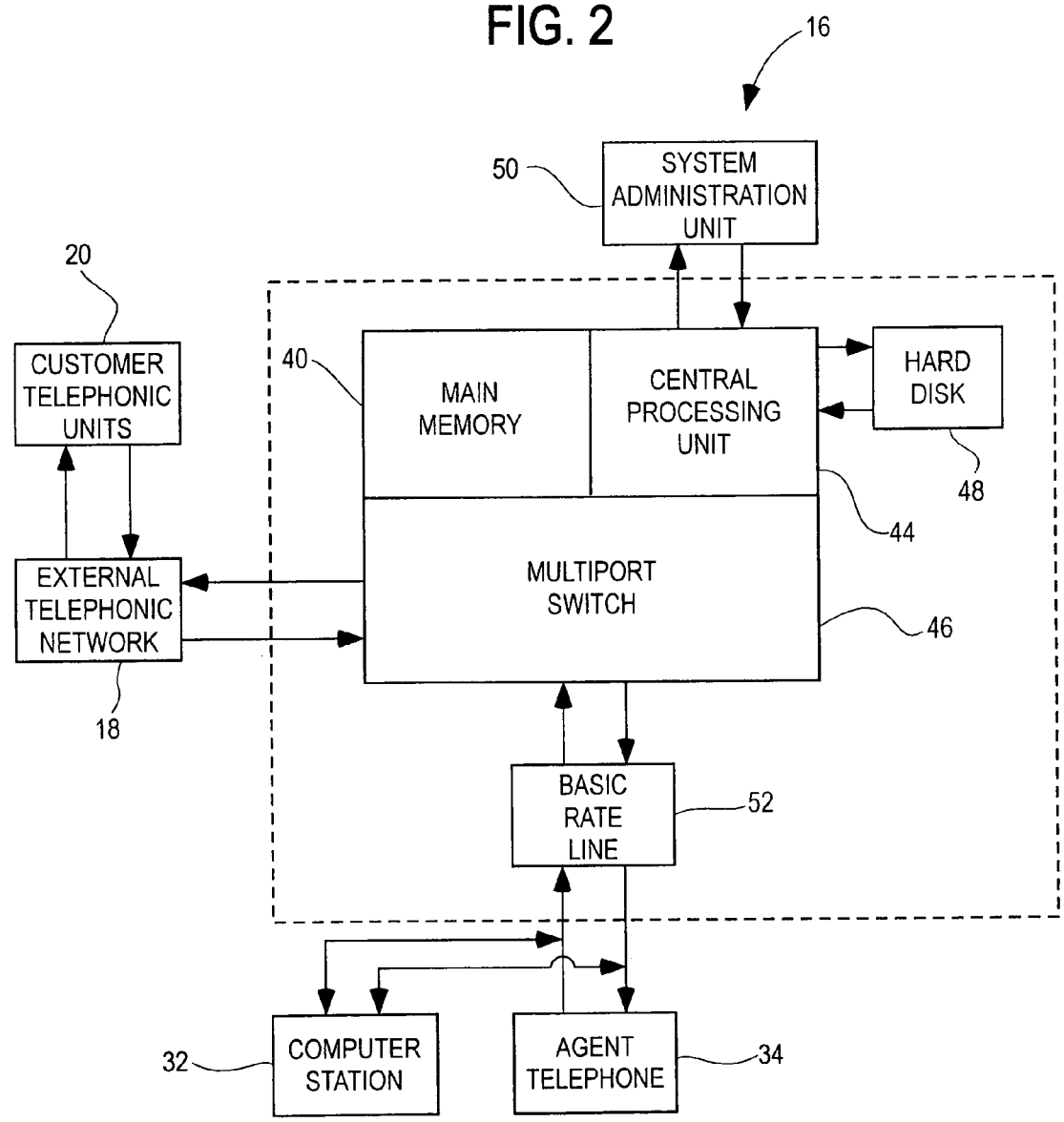
FIG. 2 is a block diagram of a specific example of a known automatic call distributor system.

Referring now to FIGS. 1 and 2, FIG. 2 shows the an example of an ACD 16 in greater detail. The ACD 16 may comprise hardware and/or software and, for example, may include a main memory 40, a central processing unit 44 and a multiport switch 46, each of which may be separate units, distributed components, or integrated at a single location or single cabinet. The multiport switch 46 is coupled to the PSTN 18, which in turn, is connected to customer telephones 20 or other communication devices, for example, devices 22 or 24. The central processing unit 44 may include storage, such as hard disk storage 48, and may also be coupled to a system administration unit 50. The ACD 16 is connected through a suitable communication link to the plurality of agent telephonic sets 34, for example, through a basic rate line 52, as is known in the art. The agent computer station 32 and the agent telephone sets 34 may be incorporated into a single unit, as is known in the art.

The illustrated ACD 16 may handle voice communication and may also handle non-voice communication, such as emails, facsimile, chat room dialog, instant messaging, Internet, etc. Non-voice dialog communication is another form of contact communication and the ACD 16, when configured and coupled to appropriate hardware and/or software devices, as described below, is not limited to processing voice-based telephone calls. The ACD 16 may be a single integrated device, or may include distributed hardware and software. In one specific embodiment, the SPECTRUM ACD product available from Rockwell FirstPoint Contact may include a non-voice dialog communication processor, such as a Contact Integration Manager (CIM) 56, which may, for example, be a CIM Release No. 1.1, which is also available from Rockwell FirstPoint Contact. In the specific embodiment shown, the communication processor 56 or CIM (also referred to as non-voice dialog communication processor or communication processor) may handle the non-voice dialog communication between the customer or caller, and the agent.

The communication processor 56 may be operatively coupled to the ACD 16 and to the agent computer 32 or agent stations 30. Typically, the communication processor 56 receives email, chat room dialog, facsimile, instant message, Internet communication, and the like from a communication processor server 58. The communication processor server 58, in turn, may receive additional non-voice dialog contact communication from a web server 60, which may be connected to the PSTN 18 or some other communication network, as is known in the art. In one specific embodiment, the communication processor 56 may be separate from the ACD 16 and operatively coupled to the ACD 16. Alternatively, the communication processor 56 may be integrated into a portion of the ACD 16 or any other processor or processors in the system. In another embodiment, at least a portion of the communication processor 56 functionality may be part of the agent station computer 32, which may be, for example, a personal computer. The communication processor 56 may be any suitable computing device, such as, for example a microprocessor, RISC processor, mainframe computer, work station, single-chip computer, distributed processor, server, controller, micro-controller, discrete logic computer, remote computer, personal computer, internet computer, web computer, and the like.

With respect to the apparatus and method described herein, the term ACD 16 is used interchangeably to mean either the ACD and/or the communication processor 56, or a combination of both. Both terms relate to a "transaction processing system" and because the ACD 16 and the communication processor 56 may be so closely related or the functions so distributed that a meaningful distinction may not be able to be made with respect to which particular component is performing a specific step described. Accordingly, for purposes of illustration only, the below-described method will be described in terms of the ACD 16 performing the step or the communication processor 56 performing the step, even though a separate component or subcomponent, such as the other of above-mentioned components, may actually perform the step or process.

The communication processor 56 in the illustrated embodiment is configured to facilitate sending and receiving non-voice dialog communication between the caller and the agent or agent terminal 30, and to transmit a signal to the ACD 16 indicating that the communication processor received the non-voice dialog communication from the caller. The signal from the communication processor 56 to the ACD 16 creates a "call appearance" so that the ACD is brought into the communication "loop," and is able to track the contact. The call appearance simulates to the ACD 16 the appearance of a voice-type call even though a voice-type call is not present. Once the call appearance to the ACD 16 has been made, the ACD can queue and track the non-voice dialog communication to the appropriate agent as if the call were an ordinary interactive voice-dialog call, even though the ACD may not utilize or connect its voice channel to the agent. Rather, the communication processor 56 may handle the non-voice dialog communication and provide the call to the agent, and also inform the ACD 16 regarding the status and initiation of the call.

Accordingly, once the call appearance has been made, the ACD 16 in the illustrated embodiment of FIG. 1 selects a particular agent to receive the non-voice dialog communication from the communication processor 56, and then causes the non-voice dialog communication to be routed to the selected agent by the communication processor. In known automatic call distribution systems, selection of the agent is performed according to any suitable method including known methods, such as the agent's availability, time past since prior contact, number of calls previously processed by the agent, skill or efficiency rating of the agent, and the like.

In known ACD systems, when such a contact is routed to an agent, the system notifies the agent that a call has arrived, by means known in the art. For example, a message may appear on the agent station 30 and/or an audible signal may be sent to the agent. If the incoming call is a voice dialog communication, the agent speaks with the caller. If the incoming call is a text-based communication, the agent may communicate with the caller by reading and typing messages on the agent station 30 or agent computer.

The transaction processing system 16 preferably routes voice dialog communication to a selected agent station 30 for servicing by an associated agent using the agent telephone 34 or headset. In conjunction with the communication processor 56, the transaction processing system 16 may, for example route non-voice dialog or text-based communication to the selected agent station. Again, as set forth above, the communication processor 56 need not be separate or apart from the transaction processing system 16 and may be operatively incorporated into the transaction processing system. In operation, the transaction processing system 16 and/or the communication processor 56 routes incoming calls from the callers to the agents, where the incoming calls may be voice dialog communication or non-voice dialog communication, such as VoIP (voice-over Internet protocol), email, facsimile, chat room dialog, instant messages, and other Internet contacts.

Figure 3:
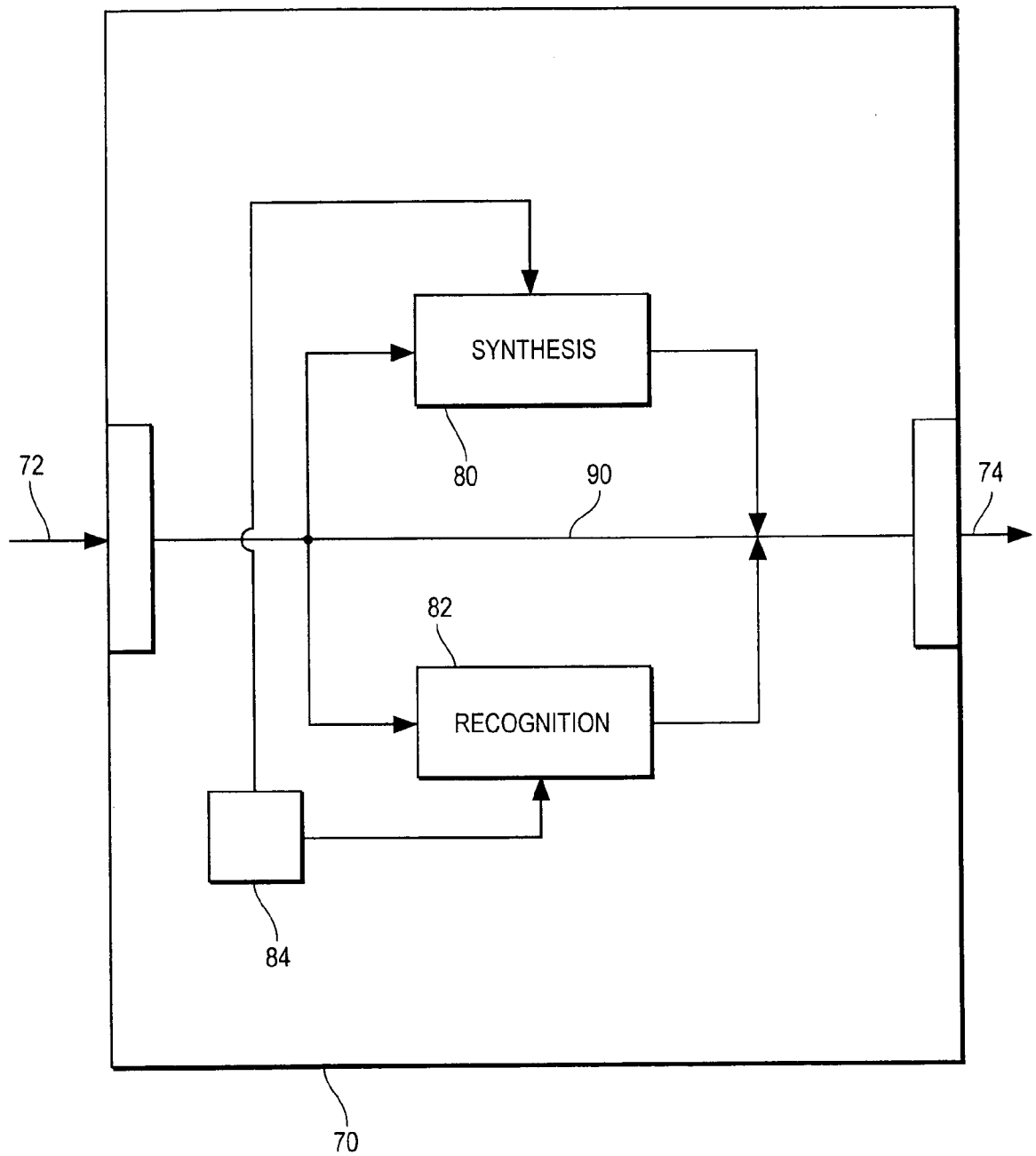
FIG. 3 is a functional block diagram of a specific embodiment of a media translator.

Referring now to FIGS. 1 and 3, a media translator 70 may be operatively coupled to the agent station 30 as shown in FIG. 1. Note that the media translator 70 is preferably coupled to the agent station 30, but alternatively, may be coupled to or may be part of the ACD 16 or the communication processor 56, or may be separate therefrom. It is immaterial where the media translator 70 is physically located. Further, the media translator may be in the form of hardware or processing devices, or may be implemented in software, which may, for example, execute on the agent station 30.

In the specific embodiment of FIG. 1 where the media translator 70 is operatively coupled to the agent station 30, the media translator receives data from the agent station on an input line 72 and provides output data to the agent station on an output line 74. In the illustrated embodiment of FIG. 3, the input line 72 is further coupled to a speech synthesizer 80 and to a speech recognition device 82. The speech synthesizer 80 and the speech recognition device 82 provide data output on the output line 74. An agent preference setting or switch 84 is coupled to the speech synthesizer 80 and the speech recognition device 82.

The speech recognition device 82, may be, for example a commercially available speech recognition device, such as Dragon Naturally-Speaking, Version 6, available from Dragon Systems, or ViaVoice For WINDOWS, Professional Edition, Release 9, available from IBM Corporation. In the illustrated embodiment of FIG. 3, the aforementioned voice recognition devices are implemented as a software module, and thus, may run on the agent station 30. However, such voice recognition systems may include separate hardware signal processors, such as digital signal processors and other hardware-based components. As stated above, the speech recognition device may be located anywhere in the system, such as part of the agent station 30, the ACD system 16, or the communication processor 56, or may be separate and apart therefrom. The speech recognition device 82 receives spoken human speech, recognized the individual spoken words, and provides a text-based copy of the spoken words, as is known in the art. The text is preferably provided to the agent on the agent station 30.

The speech synthesizer 80, may be, for example a commercially available speech synthesizer, such as Natural Voice available from AT&T Corporation, Microsoft Reader Text-To-Speech Package 2.0 available from Microsoft Corporation, or Festival Speech Synthesis Systems Version 1.4.2 (July 2001) available from The Center For Speech Technology Research, University of Edinburgh in the United Kingdom. Any suitable commercially available text-to-speech system may be used. Such systems are often referred to as "text-to-speech" systems because they accept text and convert the text to human speech. As is known in the art, the user may choose various features and qualities of the synthesized voice, such as whether the voice is of a man or woman, the speed of the speech, the loudness of the speech, and the like.

The agent preference setting 84 may be, for example, a hardware switch, a software switch, or may be contained in a file accessible to the agent station 30, the ACD system 16, or the communication processor 56. The agent preference setting 84 may be set by the agent to inform the system as to the agent's preference with respect to the communication mode, that is, whether the agent prefers to send and receive voice-based dialog or text-base dialog. The agent preference setting 84 may be preferably changed by the agent at any time or by another, such as by a system supervisor. For example, the agent may change the agent preference setting 84 at the beginning of a work day, or at any time during the work day. Based on the selection of the agent preference setting 84, the media translator 70 may facilitate translation of the voice-mode communication to the text-mode communication or may facilitate the translation of the text-mode communication to the voice-mode communication.

The action taken by the media translator 70 depends upon two factors, namely, the selection of the agent preference setting, i.e., whether the agent prefers voice-mode or text-mode, and the type of communication sent by the caller, i.e., whether the incoming contact is voice dialog or text dialog. Obviously, if the agent preference setting is set to voice-mode and the incoming call is a voice dialog communication, no translation need be preformed. In this case, the media translator 70 is placed in a "pass-through" mode where no media translation occurs. This is shown by a path 90 in FIG. 3. In the pass-through mode, neither the speech synthesizer 80 nor the voice recognition device 82 performs their respective function. Similarly, if the agent preference setting is set to text-mode and the incoming contact is a non-voice dialog communication, no translation need be preformed. Again, the media translator 70 is placed in a "pass-through" mode where no media translation occurs.

Media translation preferably occurs if the agent preference setting 84 does not match the mode of the incoming call. In one specific embodiment, if the agent preference setting 84 is set to the voice-mode and the incoming communication from the caller is a text-mode communication, all communication presented to and sent by the agent will be voice-mode communication. Accordingly, the speech synthesizer 80 converts the text-mode communication from the caller to a voice-mode communication for the agent, and the speech recognition unit 82 converts the voice-mode communication from the agent to a text-mode communication for the caller. In this way, all of the communication received by the agent and sent by the agent is in the voice-mode, while during the communication, the caller sends and receives communication in text-mode without realizing that the party to whom he or she is communicating utilizes only voice-mode communication.

In the converse situation, if the agent preference setting 84 is set to the text-mode and communication from the caller is a voice-mode communication, all communication presented to and sent by the agent will be text-mode communication. Accordingly, the speech synthesizer 80 converts the text-mode communication from the agent to a voice-mode communication for the caller, and the speech recognition unit 82 converts the voice-mode communication from the caller to a text-mode communication for the agent. In this way, all of the communication received by the agent and sent by the agent is in the text-mode, while during the communication, the caller sends and receives communication in voice-mode without realizing that the party to whom he or she is communicating is utilizing only text-mode communication. Of course, this depends in part upon the quality of the synthesized voice and the delay, which may be present because the agent must type his or her response.

The above may occur without user or agent intervention, except for the agent setting the agent preference setting 84 at some point. Of course, the agent preference setting 84 may be set to a default, for example, voice-mode communication. Additionally, the voice-to-text recognition and the text-to-speech synthesis preferably occur in real time and preferably have no noticeable delays that would affect the agent's response.

Alternatively, it may be desirable to increase the callers "comfort level," which may be achieved by providing an agent whose voice characteristics, such as the accent, match those of the caller (if the caller is in voice-mode). Accordingly, if the caller has, for example, a Southern accent, any synthesized voice response from the agent may be "enhanced" by having a Southern accent. Accent control may be one feature provided by the commercially available speech synthesizer through the modification of pitch and tonal variations of generated speech signals. Of course, if the agent is operating in text-mode, he is not able to directly determine if the caller has a particular accent, if any. Accordingly, a hypothesis may be made as to a probable accent of the caller depending upon, for example, the geographical location of the caller or identity of the caller.

For example, the incoming call preferably includes ANI (automatic number identification) fields and DNIS (dialed number information service) fields, as is known in the art. For purposes of illustration, these fields are referred to as call information identifiers. In one embodiment, the ACD 16 or the communication processor 56 may analyze the ANI numbers to determine the geographical location of the caller based on area code. Using this information, a particular accent may be used in the voice synthesis.

Alternatively, some transaction processing systems may initially provide the caller with a recorded or automated voice message, which requests certain information or predetermined data from the caller. The caller may then use the touch-tone key pad to enter the requested information. For example, the caller may be asked to provide his or her social security number, credit card number, account number, and the like. If the caller provides information, such as account number, additional information may be available about the caller from a database 126, which may be accessible by the ACD 16. Accordingly, the caller's address may be obtained. In this way, the geographical location of the caller may be determined so that the appropriate accent may used in the voice synthesis.

Specific embodiments of a media translator for a transaction processing system according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A media handler for use in a transaction processing system, the system configured to route incoming calls from callers to agents associated with the transaction processing system, the incoming calls based on at least one of a voice-mode communication and text-mode communication, the media handler comprising:
 a media translator configured to facilitate translation between the voice-mode communication and the text-mode communication;
 a speech recognition unit configured to convert the voice-mode communication to the text-mode communication;
 a speech synthesizer configured to convert the text-mode communication to the voice-mode communication;
 an agent preference setting selectable between a voice-mode and a text-mode;
 wherein if the agent preference setting is set to the voice-mode and communication from the caller is a text-mode communication, the speech synthesizer converts the text-mode communication from the caller to a voice-mode communication for the agent, and the speech recognition unit converts the voice-mode communication from the agent to a text-mode communication for the caller; and
 wherein if the agent preference setting is set to the text-mode and communication from the caller is a voice-mode communication, the speech synthesizer converts the text-mode communication from the agent to a voice-mode communication for the caller, and the speech recognition unit converts the voice-mode communication from the caller to a text-mode communication for the agent.

2. The media handler according to claim 1 wherein the media translator is set to a pass-through mode if the agent preference setting corresponds to the communication mode of the caller such that the mode of the communication is not altered.

3. The media handler according to claim 1 wherein the agent preference setting is at least one of a hardware switch and a software switch.

4. The media handler according to claim 1 wherein the agent preference setting is contained in a file that is accessible by at least one of the media translator and the transaction processing system.

5. The media handler according to claim 1 wherein the mode of the communication is converted transparently without intervention by the agent.

6. The media handler according to claim 1 wherein the mode of the communication is converted in real-time.

7. The media handler according to claim 1 wherein the speech synthesizer adds a predetermined accent to the converted voice-mode communication.

8. The media handler according to claim 7 wherein the speech synthesizer adds the predetermined accent to the converted voice-mode communication based upon a geographical location of the caller.

9. The media handler according to claim 7 wherein speech synthesizer unit adds the predetermined accent to the converted voice-mode communication based upon predetermined data contained in a database corresponding to the caller.

10. The media handler according to claim 8 wherein the geographical location of the caller is determined from call information identifiers.

11. The media handler according to claim 10 wherein the call information identifiers correspond to at least one of automatic number identification and dialed number information service.

12. A media translator for use in a transaction processing system, the system configured to route incoming calls from callers to agents associated with the transaction processing system, the incoming calls based on voice-mode communication and text-mode communication, the media translator comprising:
 first converting means for converting the voice-mode communication to the non-voice-mode communication;
 second converting means for converting the non-voice-mode communication to the voice-mode communication;
 means for indicating an agent preference selectable by the agent between a voice-mode and a non-voice-mode, and configured such that when the voice-mode is selected and communication from the caller is a non-voice-mode communication, the second converting means converts the non-voice-mode communication from the caller to a voice-mode communication for the agent, and the first converting means converts the voice-mode communication from the agent to a non-voice-mode communication for the caller; and
 when the non-voice-mode is selected and communication from the caller is a voice-mode communication, the second converting means converts the non-voice-mode communication from the agent to a voice-mode communication for the caller, and the first converting means converts the voice-mode communication from the caller to a non-voice-mode communication for the agent.

13. The media translator according to claim 12 wherein the first converting means is a speech recognition device.

14. The media translator according to claim 12 wherein the second converting means is a speech synthesizer.

15. The media handler according to claim 12 wherein the means for indicating agent preference is at least one of a hardware switch and a software switch.

16. The media handler according to claim 12 wherein the means for indicating agent preference is contained in a file that is accessible by at least one of the media translator and the transaction processing system.

17. The media handler according to claim 12 wherein the mode of the communication is converted transparently without intervention by the agent.

18. In a transaction processing system configured to route incoming voice-mode communication and incoming text-mode communication to agents associated with the transaction processing system, a method for translating a mode of the communications comprising the steps of:
 setting an agent preference indicator, the indicator selectable according to at least one of a voice-mode and a text-mode;
 converting the text-mode communication from the caller to a voice-mode communication for the agent and converting the voice-mode communication from the agent to a text-mode communication for the caller if the indicator is set to the voice-mode and the communication from the caller is a text-mode communication; and
 converting the text-mode communication from the agent to a voice-mode communication for the caller and converting the voice-mode communication from the caller to a text-mode communication for the agent if the indicator is set to the text-mode and the communication from the caller is a voice-mode communication.

19. A media handler for use in a transaction processing system, the system configured to route incoming calls from callers to agents associated with the transaction processing system, the incoming calls based on at least one of a voice-mode communication and text-mode communication, the media handler comprising:
- a media translator configured to facilitate translation between the voice-mode communication and the text-mode communication;
- a speech recognition unit configured to convert the voice-mode communication to the text-mode communication;
- a speech recognition unit configured to convert the voice-mode communication to the text-mode communication;
- an agent preference setting selectable between a voice-mode and a text-mode; and
- wherein if the agent preference setting is set to the voice-mode and communication from the caller is a text-mode communication, the speech synthesizer converts the text-mode communication from the caller to a voice-mode communication for the agent, and the speech recognition unit converts the voice-mode communication from the agent to a text-mode communication for the caller.

20. A media handler for use in a transaction processing system, the system configured to route incoming calls from callers to agents associated with the transaction processing system, the incoming calls based on at least one of a voice-mode communication and text-mode communication, the media handler comprising:
- a media translator configured to facilitate translation between the voice-mode communication and the text-mode communication;
- a speech recognition unit configured to convert the voice-mode communication to the text-mode communication;
- a speech synthesizer configured to convert the text-mode communication to the voice-mode communication;
- an agent preference setting selectable between a voice-mode and a text-mode; and
- wherein if the agent preference setting is set to the text-mode and communication from the caller is a voice-mode communication, the speech synthesizer converts the text-mode communication from the agent to a voice-mode communication for the caller, and the speech recognition unit converts the voice-mode communication from the caller to a text-mode communication for the agent.

* * * * *